US007795837B1

(12) United States Patent
Haun et al.

(10) Patent No.: US 7,795,837 B1
(45) Date of Patent: Sep. 14, 2010

(54) PORTABLE SOLAR POWER SUPPLY TRAILER WITH A SECURITY CONTAINMENT AREA AND MULTIPLE POWER INTERFACES

(75) Inventors: Darrell N. Haun, Sugar Land, TX (US); Donald N. Haun, Stafford, TX (US)

(73) Assignee: Solarcraft, Inc., Stafford, TX (US)

( * ) Notice: Subject to any disclaimer, the term of this patent is extended or adjusted under 35 U.S.C. 154(b) by 0 days.

(21) Appl. No.: 12/606,409

(22) Filed: Oct. 27, 2009

(51) Int. Cl.
*H01M 10/44* (2006.01)
*H01L 31/042* (2006.01)

(52) U.S. Cl. ............................ 320/101; 136/244
(58) Field of Classification Search ............... 320/101
See application file for complete search history.

(56) References Cited

U.S. PATENT DOCUMENTS

| | | | | |
|---|---|---|---|---|
| 4,261,329 A | * | 4/1981 | Walsh et al. | 126/569 |
| 5,969,501 A | * | 10/1999 | Glidden et al. | 320/101 |
| 6,041,242 A | * | 3/2000 | Coulthard | 455/575.1 |
| 6,396,239 B1 | * | 5/2002 | Benn et al. | 320/101 |
| 7,388,348 B2 | * | 6/2008 | Mattichak | 320/101 |
| 2009/0026842 A1 | * | 1/2009 | Hunter et al. | 307/66 |
| 2009/0079161 A1 | * | 3/2009 | Muchow et al. | 280/400 |
| 2009/0288698 A1 | * | 11/2009 | Chen | 136/244 |

* cited by examiner

*Primary Examiner*—Patrick J Assouad
*Assistant Examiner*—M'Baye Diao
(74) *Attorney, Agent, or Firm*—Buskop Law Group, PC; Wendy Buskop

(57) ABSTRACT

A portable solar power supply trailer with a security containment area and multiple power interfaces, wherein the trailer has a trailer frame with wheels on axels and a support hitch. An enclosure on the trailer frame covers about 25 percent of the trailer frame and a solar array frame is disposed on the enclosure, and wherein the solar array frame covers the entire trailer frame and the enclosure, and the solar array frame has at least one photovoltaic cell. The enclosure has plurality of power interfaces for access by a user external to the enclosure, a plurality of batteries, a solar controller, a power interface timer in the enclosures for providing power to the power interfaces, and two posts and two supports for supporting the solar array frame.

20 Claims, 8 Drawing Sheets

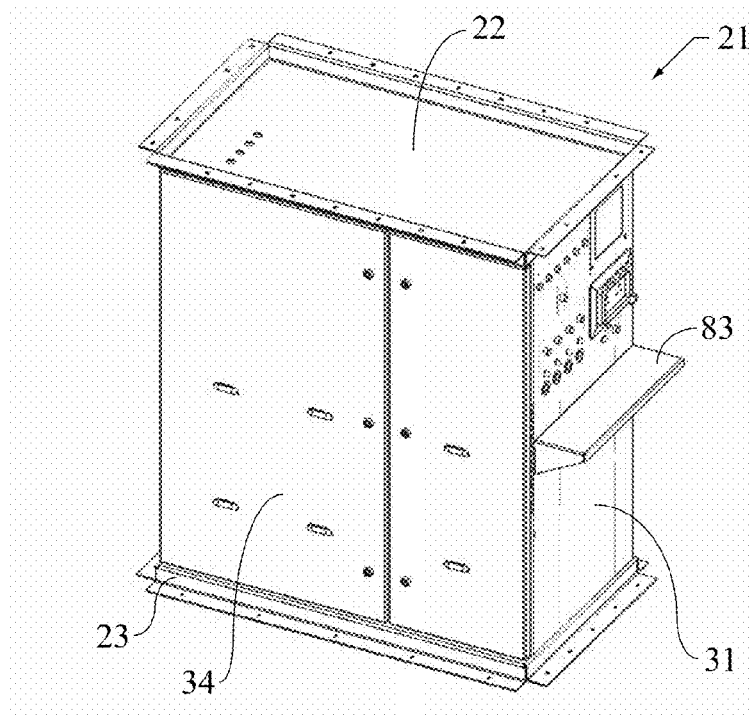
FIGURE 4A
FIGURE 4B
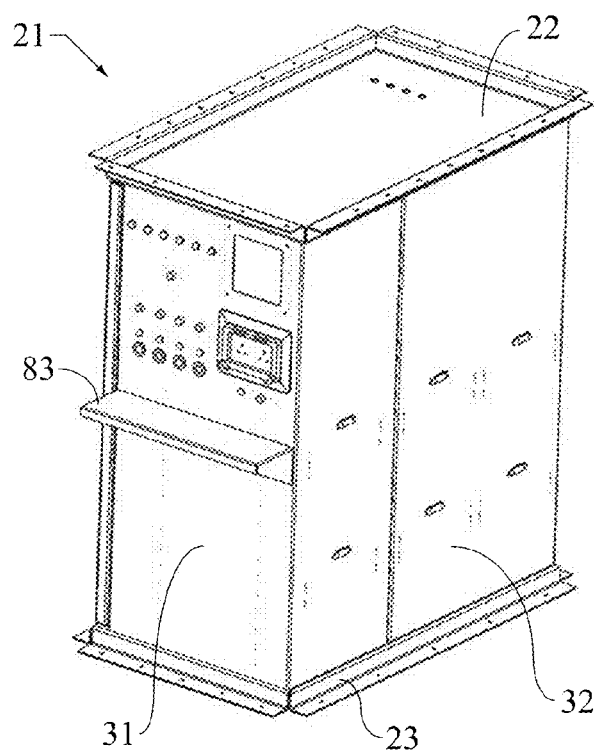

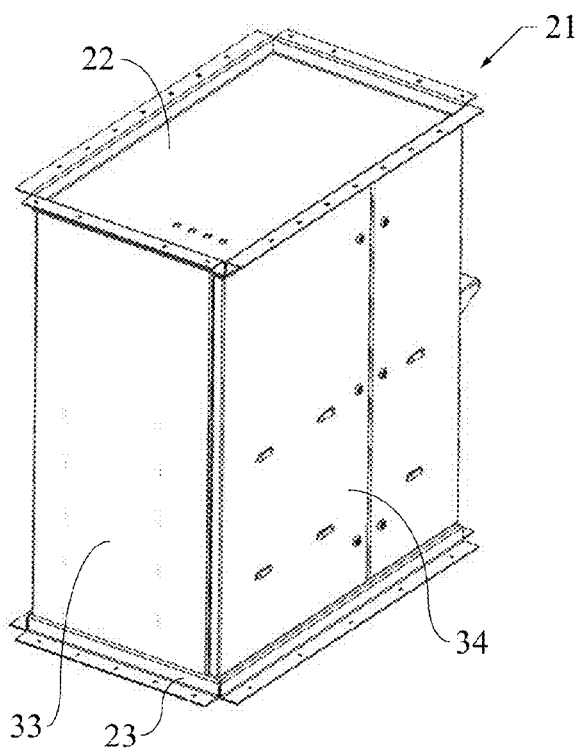
FIGURE 4C
FIGURE 4D
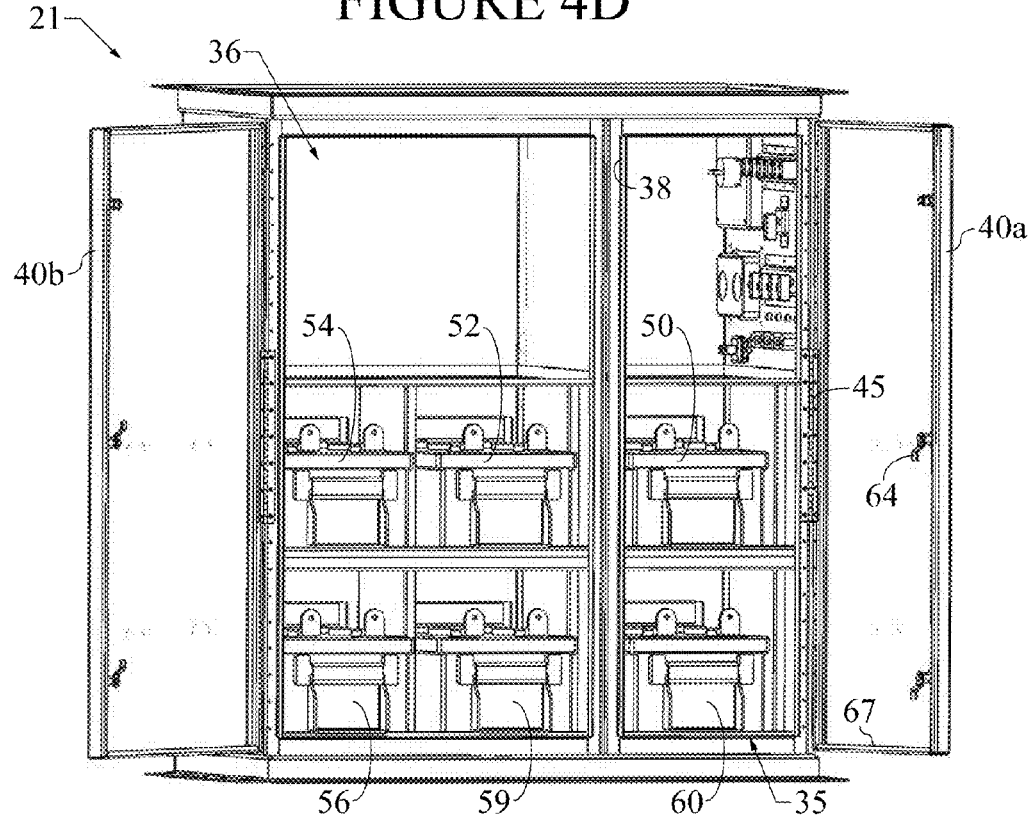

PORTABLE SOLAR POWER SUPPLY TRAILER WITH A SECURITY CONTAINMENT AREA AND MULTIPLE POWER INTERFACES

FIELD

The present embodiments generally relate to portable solar power supply trailer using at least one photovoltaics, which can be attached to a car or truck and towed into the desert or other remote areas to charge portable handheld electronics like cell phones, laptops, and portable global positioning system "GPS" devices.

BACKGROUND

A need exists for a portable solar power supply trailer with security containment area and multiple power interfaces.

A need has existed for a power supply trailer having a trailer frame with wheels on axles and a support hitch that can be used in remote areas.

A need has existed for a power supply trailer having an enclosure on the trailer frame covering no more than 25 percent of the trailer frame for providing outlets of power to users to recharge portable electronics in the field.

A need has existed for a portable solar power supply trailer with a solar array frame disposed on and enclosure for providing portable power, using a solar array frame that covers the entire trailer frame and the enclosure and contains at least one photovoltaic cell.

The present embodiments meet these needs.

BRIEF DESCRIPTION OF THE DRAWINGS

The detailed description will be better understood in conjunction with the accompanying drawings as follows:

FIG. 4A-4D shows different embodiments of the enclosure.

Figure 1:
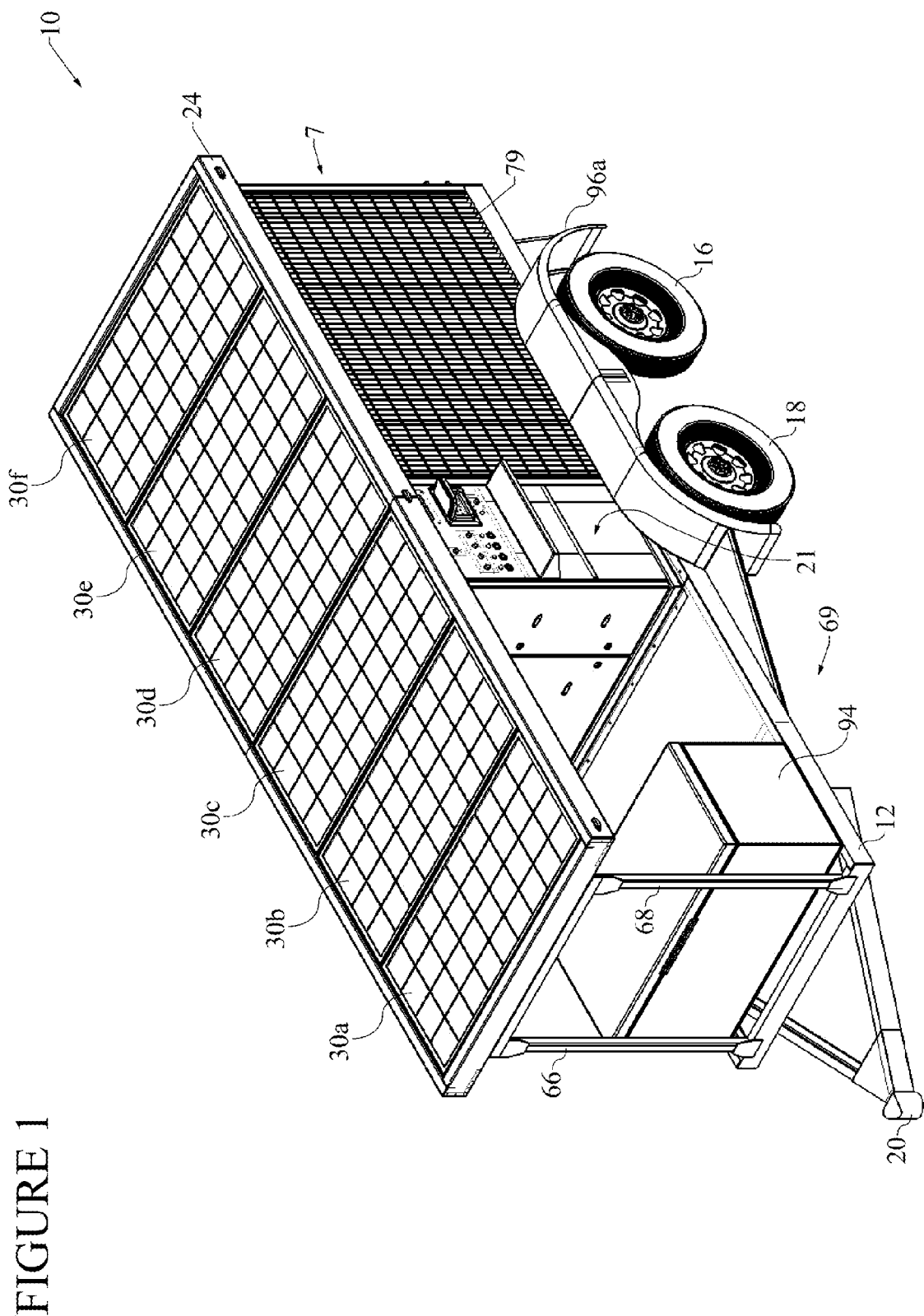
FIG. 1 is a front perspective view of a portable solar power supply trailer

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a portable solar power supply trailer with security containment area and multiple power interfaces.

The trailer can be made up of a trailer frame, which can be powder coated steel and attached to the frame can have at least one axel. A wheel can be secured to opposite sides of each axel along with brakes and springs.

A support hitch can be connected to the trailer frame to attaching to a car, truck, pickup or another trailer.

In an embodiment, an enclosure, which can be a 6 sided closable box can be disposed on the trailer frame.

The enclosure can have an enclosure top, an enclosure bottom, and four sides. A first enclosure side can be integral with a second enclosure side, a third enclosure side can be integral with the second enclosure side and a fourth enclosure side. The enclosure bottom can be fastened to the trailer frame. The enclosure covers no more than 25 percent of the trailer frame and provides an openable box for installing various electronics.

A solar array frame with four sides can be disposed on the enclosure. The solar array frame covers the entire trailer frame and sits on top of the enclosure top.

The solar array frame can be supported by two poles at the front of the trailer frame and two supports at the back, enabling the solar array frame to be secured on top of the enclosure. The design enables the photovoltaics that are contained in the solar array frame, such as at least one solar panels, such as those made by Kyocera to be horizontal and flat and usable in areas near the equator.

The photovoltaic cell provides power to at least one solar controller that facilitates charging at least one battery that can also be contained within the enclosure.

The enclosure has a design that is rugged and generally water proof for outdoor use. The enclosure can be made from powder coated steel.

The enclosure can have the aforementioned fours sides, a top and a bottom. Around the top and bottom perimeters can be a 1 inch to 2 inch flange, which can enable lifting of the enclosure onto the trailer frame to be allow for easy construction of the solar powered power supply trailer.

In addition to the top and bottom flanges, which can be made from powder coated steel, and can further contain at least 1 lifting hole. A flange can surround the perimeter of an opening formed in the fourth side of the enclosure, which can further have a, which can be hingedly attached. This projecting flange enables the door to further support a rubber or synthetic flexible gasket which enables the door to have an insulated seal with the fourth side flange.

In the interior space of the enclosure, which is formed by the enclosure sides, is contained at least one battery, and up 12 batteries, which can be lead based chargeable car or marine batteries, or a similar rechargeable DC battery.

The batteries can be contained in the space using Styrofoam™ or other closed cell phone insulation, and each can be held into the enclosure with a removable bar that can click into brackets, enabling the batteries to be held securely during transit without bumping or crashing about in the enclosure.

The solar controller in the enclosure can be adapted to receive a charge from the photovoltaics contained in the solar array through an electrical conduit that runs from the solar array frame into the top of the box.

The power from the solar array, which can be volts, 9 volts, 12 volts and up to 52 volts, or any voltage in between, can be used to charge the batteries either in series, in parallel or in parallel and in series.

A battery balancing circuit can be placed between the batteries to ensure that the charging continues when the batteries are in a quiescent mode, a charging mode, or experience a load. The battery balancing circuit is a unique feature that provides a long lasting power supply in a remote environment, by ensuring that all batteries are usable instantly, that is, all batteries will be able to support a load, which is very important for military uses.

Connected to the batteries and nested in one or more sides of the enclosure are a plurality of power interfaces. The power interfaces can provided mixed currents, that is a first power interface can be a 6 volt interface, 12 volt, 24 volt or some other DC voltage between about 6 volts to about 54 volts allowing the plug in of a charging cable from a user electronic device, like a cell phone into the power interface, which can be a "cigarette lighter" power plug what communicates to the batteries. For example, it could be a power interface used to charge cellular phones, iPods™, or emergency medical equipment, such as heart monitors.

Additional power interfaces can be AC power interfaces providing current from the batteries between about 110 volts to about 230 volts for use with portable gas analyzers, portable seismic equipment, portable radio equipment or other equipment that would need recharging in the field, or need to be plugged into a 110 power supply or 220 power supply in order to work, such as a mini-refrigerator, a small fan, and various types of lighting devices, such as lights usable for landing helicopters or airplanes in a remote location.

The power interfaces of the solar power supply trailers can be used to assist in running field hospital equipment in the event of a natural disaster, such as flooding in an area, or a hurricane affected zone.

The power interfaces can be provided on at least one of the enclosure sides for access by a user external to the enclosure side. All the interfaces can be on one side or on different sides.

In an embodiment, all power interfaces can be identical. In another embodiment the power interfaces can be mixed and on the same trailer.

The rechargeable user device for engaging at least one power interface can be an air compression, for inflating flat tires, a weather station for detecting tornadoes with Doppler™ radar and other detection devices, a flow meter for use in drilling a well, or a similar device.

In the enclosure can be a solar controller fastened into in the interior space and connected to the photovoltaic cells of the solar array frame. The solar controller can further connect to the batteries.

The solar controller can be used to monitor and control charging of at least one of the plurality of batteries from the photovoltaics. A usable solar controller can be one made by Morningstar.

The enclosure can further have a power interface timer connected to the solar controller and a push button for actuating one or more of the power interfaces for a predefined period of time such as 15 minutes, 30 minutes or a similar amount of time. The predefined period of time can be adjusted by a user that has access to the inside space of the enclosure, so that the trailer can have a factory preset time of 10 minutes to charge, but a user in the field can change that length of time to 50 minutes, or 1.2 hours or some other length of time depending on the needs of the user with access to the side space of the enclosure.

In an embodiment, the door of the enclosure can be a locking door or similar controlled access door, such as one using a battery operated biometric lock, that reads fingerprints and is powered from at least one of the on board batteries of the enclosure.

The door of the enclosure can be secured over the opening of the fourth side using at least one fastener, which can be a locking rotatable fastener, a locking knob, or another type of fastener.

A first post and a second post, which can be made of the same material as the trailer frame can connect a front end of the solar array frame to the trailer frame. These first and second posts can be hollow, but strong enough to support the solar array frame non-deformably above the trailer frame during winds what can gust up to about 100 mph. In an embodiment the first and second posts can be welded to the trailer frame.

A first support and a second support can connect to a back end of the solar array frame for supporting the solar array frame non-deformably above the trailer frame as well. These supports can be solid metal channel bars or can be made from another solid metal plate that extends from the solar array frame to the trailer frame.

Between these first and second supports can be a cage material, what can be welded or bolted, that is a combination of horizontal and vertical bars, or plates with perforations, or similar open design, such as the type of material used by zoos to transport wild animals. The cage which can have cage material, or bars, can withstand pressure of at least about 200 pounds of pressure without deforming, and can store various materials.

A door with a frame and similar cage material secured within the frame can be used to created an openable, locking secure enclosure for storing equipment or other materials and for transporting materials while transporting the trailer, such as spare wheels, additional jacks, additional lights, wires, tools and similar materials.

In an embodiment, a steel grating can be used as the cage material and a bumper made from a material similar to automobile tires, or a slide on bumper polymer can be used to prevent the door from smashing a human hand or body part that accidently gets in the way of the door swinging open. The door of the trailer can have this safety feature of the bumper.

In an embodiment, an inverter can be used in the enclosure, disposed in the interior space for taking AC power and forming a DC current, enabling greater versatility in use of the trailer.

A first systems charge gauge can be mounted into one of the enclosure sides and connected electrically to one or more of the photovolatics enabling continuous and simultaneous monitoring of current from the photovolatics while charging one or more user devices.

A second systems charge gauge can be mounted into one of the enclosure sides, near the first systems charge gauge and connected electrically to one or more of the batteries in the enclosure enabling continuous and simultaneous monitoring of current from the batteries while charging one or more user devices.

A gasket can be placed around the door opposite the projecting flange and used to provide a water tight connection between the door and the flange.

One or more covered vents can be formed in one of the side of the enclosure allowing excess heat to escape from the enclosure to prevent damage to the electronics inside the enclosure.

It can be noted that the cage material within the supports with locking door can form a security containment area.

In an embodiment, trailer brakes can be secured to the trailer frame and trailer lights can be used when the trailer is transported and hooked up to another vehicle, such as a pick up truck or other propulsion based tow vehicle. In an embodiment the trailer can have no self propulsion means.

In an embodiment, the trailer with all parts but the photovoltaics, can be stacked one on top of the other creating a very small footprint for shipping in a standard shipping container used with container vessels, which are generally about 8 feet by about 20 feet. In other words, the wheel of one trailer can fit within the solar array frame of another trailer for secure stacking of the units, lowering the cost of transport by sea from a first location to a second location.

In another embodiment, a protective cover can be used to cover the power interfaces to protect them during shipment, or to prevent rapid deterioration from harsh weather conditions, such as the desert or the rainforest with extreme humidity.

In an embodiment, the cover can be hingedly connected to any enclosure side with a power interface. In another embodiment, multiple covers can be used and can be removably disposed over the plurality of power interfaces. In an embodiment, the covers can be rectangular and can be made of a polymer, such as polypropylene.

In an embodiment, one or more shelves or baskets can be used and disposed beneath at least one of the power interfaces for supporting one or more rechargeable user devices or devices needing power from one of the power interfaces.

At least one light can be used on the trailer to provide a lighted work space between a front portion of the trailer and the enclosure, within the cage area, over one or more of the plurality of power interfaces or combinations thereof.

Each light can be connected to a light timer for controlling illumination over the plurality of power interfaces for a preset period of time, such as 8 minutes.

One light timer can control all the lights, or different light timers can be used on each area needing illumination. The light timer can communicate with the solar controller for providing power for illumination from at least one of the batteries, the at least one photovoltaic or combinations thereof. The lights can be "red lights" for military night use, or bright white reading lights, light emitting diodes "LED" lights or halogens, depending on the trailer use that is intended.

The trailer frame can be supported by a first spring supporting the first wheel on the axel and a second spring supporting the second wheel on the axel, providing a cushioned ride.

Two trailer brake lights can be used in an embodiment.

A storage box can be mounted to the trailer frame between a front portion of the trailer frame and the enclosure for providing additional locking and weather tight storage of tools, electrical cables, portable lights, medicines, medical devices, and nonperishable food.

Fenders can be mounted over each wheel and secured to the trailer frame to control and protect the wheels from mud and sand. The fenders can be made from polymer, metal like the trailer frame, composites to lighten the cost of transport in a shipping container or combinations of these material.

Three leveling jacks can be secured to the trailer frame. A first leveling jack can be foldable for the front of the trailer frame, a second leveling jack and a third leveling jack, which can be adjacent each axel or near the back portion of the trailer, or under the cage area.

Turning now to the Figures, FIG. 1 shows a portable solar power supply trailer 10 with a security containment area 7 shown enclosed with steel grating 79.

The portable solar power supply trailer 10 has a trailer frame 12 with at least one axel secured to the trailer frame, which is shown in later Figures. A first wheel 16 and a third wheel 18 are shown and can be secured to a first axel. Over the wheels are at least one fender 96a.

FIG. 1 shows that the solar array frame 24 can contain a plurality of photovoltaics 30a, 30b, 30c, 30d, 30e, 30f, which can also be referred to herein as "solar panels". The plurality of photovoltaics can provide power for batteries, which can be located in the enclosure 21.

The solar array frame 24 is shown disposed on the enclosure 21. In an embodiment, the solar array frame can have no back plate to provide a more lightweight less expensive to transport structure.

A first post 66 and a second post 68 support the solar array frame 24 above the trailer frame 12 near the front end 69 of the trailer frame. A storage box 94 is shown mounted to the trailer frame. A support hitch 20 is also shown connected to the trailer frame 12.

Figure 2:
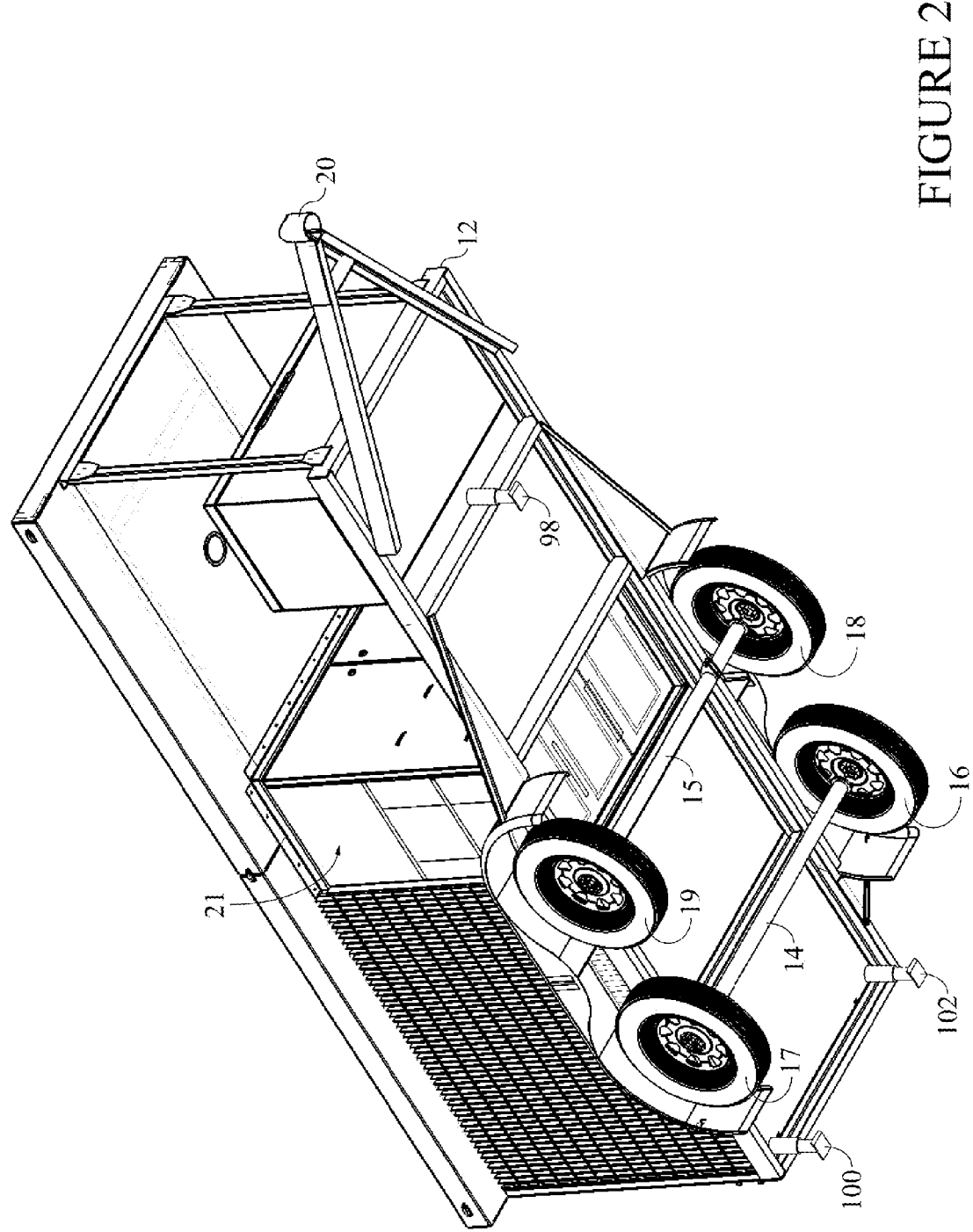
FIG. 2 is a bottom perspective view of the portable solar power supply trailer of FIG. 1.

FIG. 2 is a bottom view of the portable solar power supply trailer and depicts the trailer frame 12.

A first axel 14 with a first wheel 16 and a second wheel 17 is shown secured on the first axel opposite the first wheel. A second axel 15 is shown parallel to the first axel 14. A third wheel 18 is shown secured on the second axel 15 opposite a fourth wheel 19.

FIG. 2 also shows the three leveling jacks secured to the trailer frame. A first leveling jack 98, a second leveling jack 100 and a third leveling jack 102. The leveling jacks can be foldable and removable.

The support hitch is also shown in this Figure.

Figure 3:
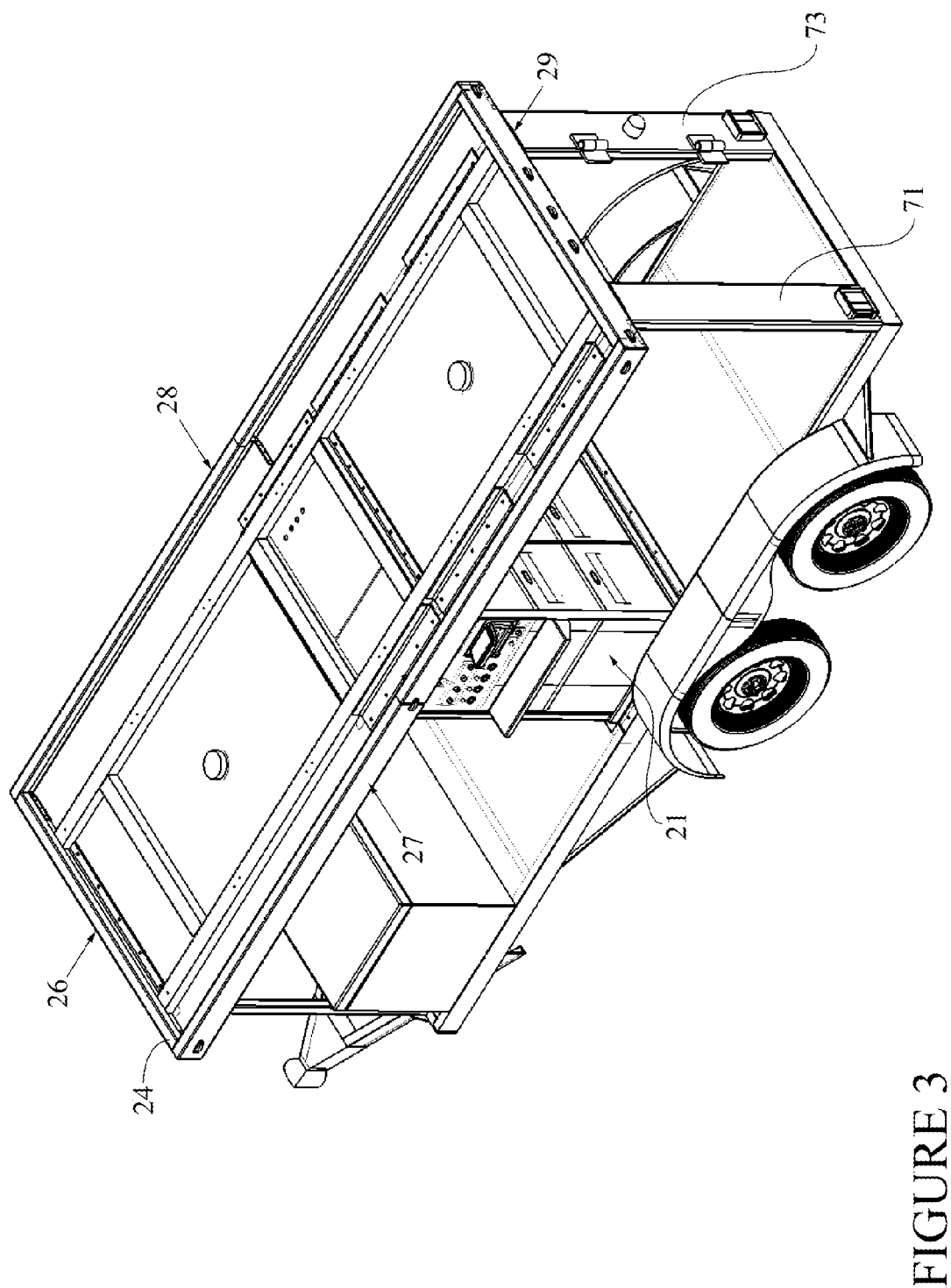
FIG. 3 is a rear perspective view of solar array frame without photovoltaics used in the portable solar power supply trailer of FIG. 1.

FIG. 3 shows a top view of the solar array frame 24 having a first side 26, second side 27, a third side 28 and a fourth side 29. The solar array frame 24 covers the entire trailer frame and the enclosure 21.

FIG. 3 shows the second post 68 and with the first support 71 and the second support 73 holding the solar array frame above the trailer frame and on top of the enclosure 21.

FIG. 4A, 4B, 4C, and 4D show embodiments of the enclosure 21.

FIG. 4A shows the enclosure 21 having an enclosure top 22 and an enclosure bottom 23. The enclosure top can be fastened to the solar array frame 24 and the enclosure bottom can be fastened to the trailer frame. Enclosure first side 31 and enclosure fourth side 34 are also depicted.

In an embodiment, the enclosure can have at least one shelf 83, which can be used to support at least one rechargeable user device, such as a cell phone or lap top when plugged into one of the plurality of power interfaces.

FIG. 4B shows the enclosure 21 having an enclosure top 22 and an enclosure bottom 23. Enclosure first side 31 and enclosure second side 32 are also depicted. At least one shelf 83 is also depicted.

FIG. 4C shows the enclosure 21 having an enclosure top 22 and an enclosure bottom 23. Enclosure third side 33 and enclosure fourth side 34 are also depicted.

FIG. 4D shows the enclosure 21 with doors 40a, 40b in an open position. Although two doors are shown in this embodiment, one door or multiple doors can be used.

The enclosures fourth side can have a fourth side opening 35 to an interior space 36 within the enclosure sides.

A projecting flange 38 can surround the fourth side opening 35 extending from the fourth side of the enclosure.

Doors 40a, 40b can be connected to the enclosure with a hinge 45. A gasket 67 can be disposed around the door to provide a watertight connection.

The door can have at least one fastener 64 for securing the door to the fourth side of the enclosure. The door can be hingedly connected to the enclosure fourth side or otherwise fastenable to the enclosure fourth side.

Batteries 50, 52, 54, 56, 59, and 60 are also shown in FIG. 4D.

Figure 5:
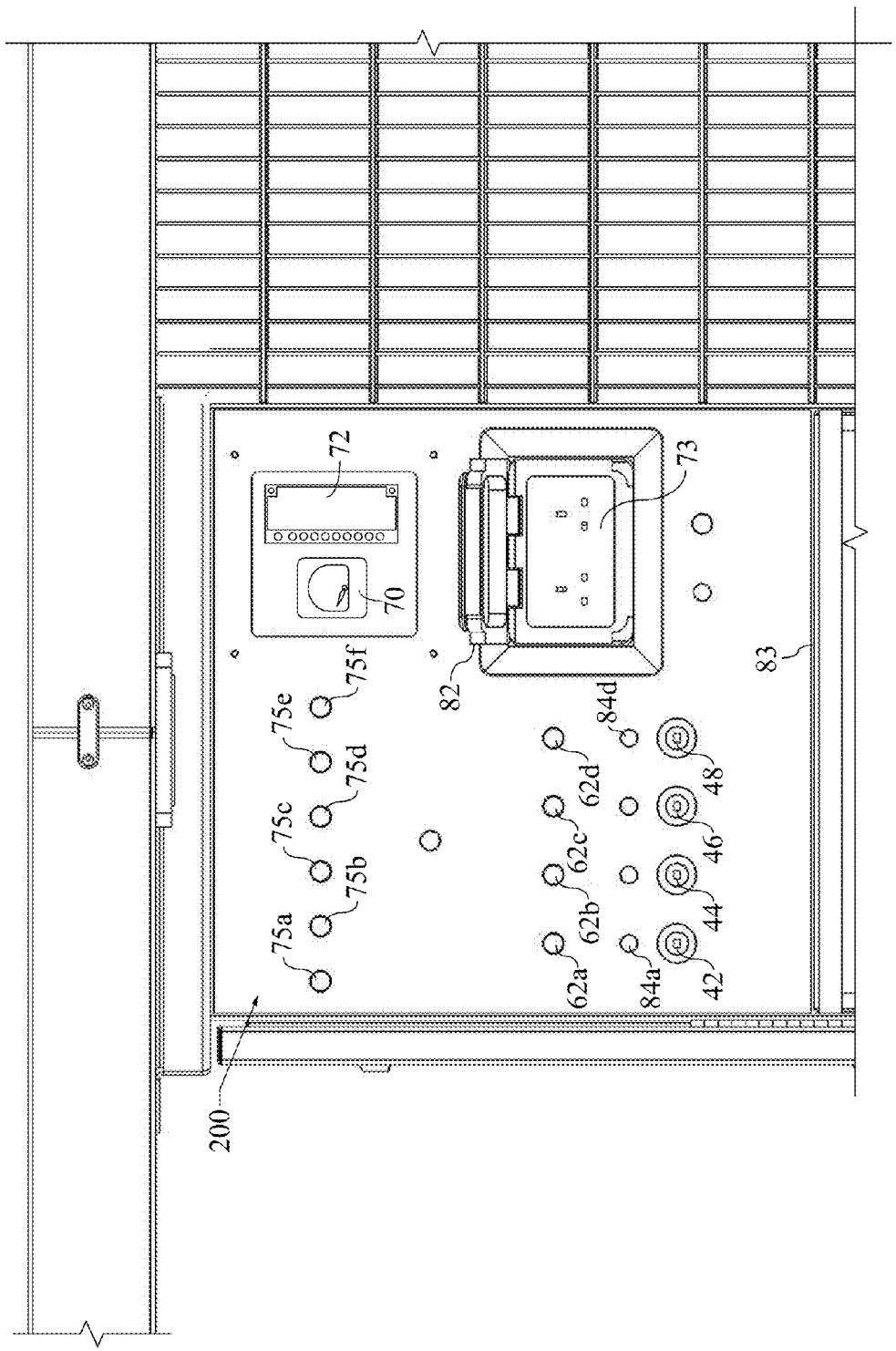
FIG. 5 is a detailed view of the power interface portion of the enclosure usable on the portable solar power supply trailer.

FIG. 5 shows a detail of the power supply and monitoring area 200 of the enclosure, with multiple power interfaces 42, 44, 46, 48 depicted on a side of the enclosure.

The multiple power interfaces enable a user to access the power from batteries in the interior space of the enclosure. Each power interface can provide between about 12 DC volts to about 24 DC volts, or between about 110 AC volts to about 230 AC volts of power to at least one rechargeable user device, such as a cell phone.

FIG. 5 further shows push button 62a for power interface 42, push button 62b for power interface 44, push button 62c for power interface 46 and push button 62d for power interface 48.

Also shown in FIG. 5 is a first systems charge gauge 70 connected to one of the enclosure sides, wherein the first systems charge gauge monitors charging current from at least one photovoltaic. A second systems charge gauge 72 is shown for monitoring the charge status of at least one of the plurality of batteries in the enclosure.

FIG. 5 shows at least one plug 73 for a user device, which can support two user devices. Additionally, a plurality of circuit breakers 75a, 75b, 75c, 75d, 75e, 75f are also shown.

FIG. 5 also shows a protective cover 82, which can be removably disposed over the multiple power interfaces 42, 44, 46, 48 as well as at least one shelf 83. The shelf 83 can be used to support at least one rechargeable user device, such as a cell phone or lap top when plugged into one of the multiple power interfaces.

Two of a plurality of lights 84a, 84b, are depicted disposed over the plurality of multiple of power interfaces.

Figure 6:
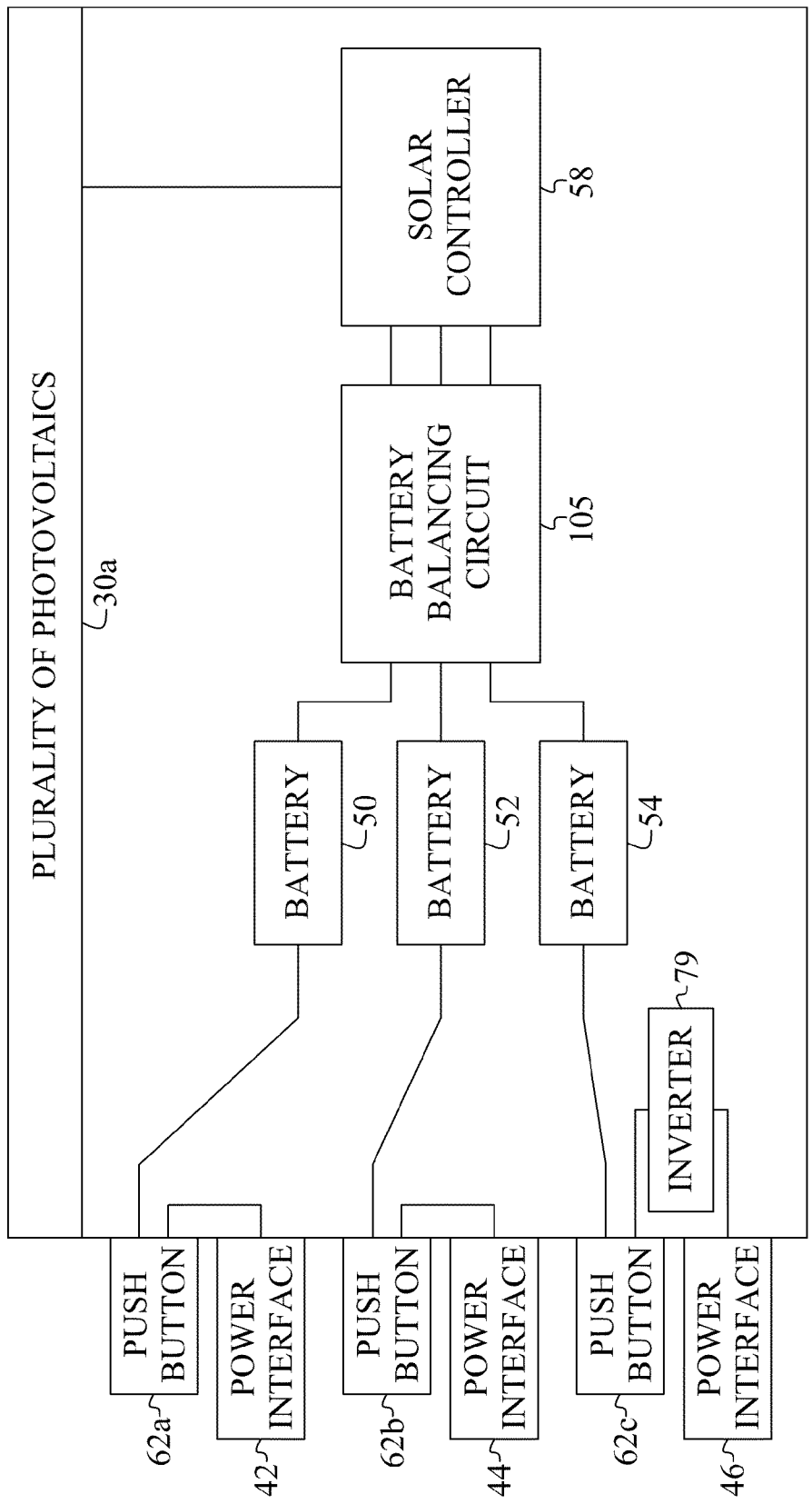
FIG. 6 is a diagram of the charging and power supply wiring of the portable solar power supply trailer.

FIG. 6 depicts a plurality of batteries 50, 52, 54 are shown and each battery can power at least one of the multiple power interfaces 42, 44, 46.

A solar controller 58 can connect to at least one photovoltaic cell of the plurality of photovoltaics 30a. The solar controller 58 can monitor and control charging of at least one of the plurality of batteries 50, 52, 54.

A power interface timer for each battery and each power interface can be used, although one is not shown in this Figure, each power interface timer can be connected to the battery. Each power interface timer can connect to a push button 62a, 62b, 62c for actuating at least one of the multiple power interfaces 42, 44, 46 for a predefined period of time.

FIG. 6 also shows a battery balancing circuit 105, which can communicate between each of the batteries and the solar controller. Additionally, an inverter 79 is shown and can be used to convert the DC voltage to AC voltage for at least one of the multiple power interfaces 42, 44, 46.

Figure 7:
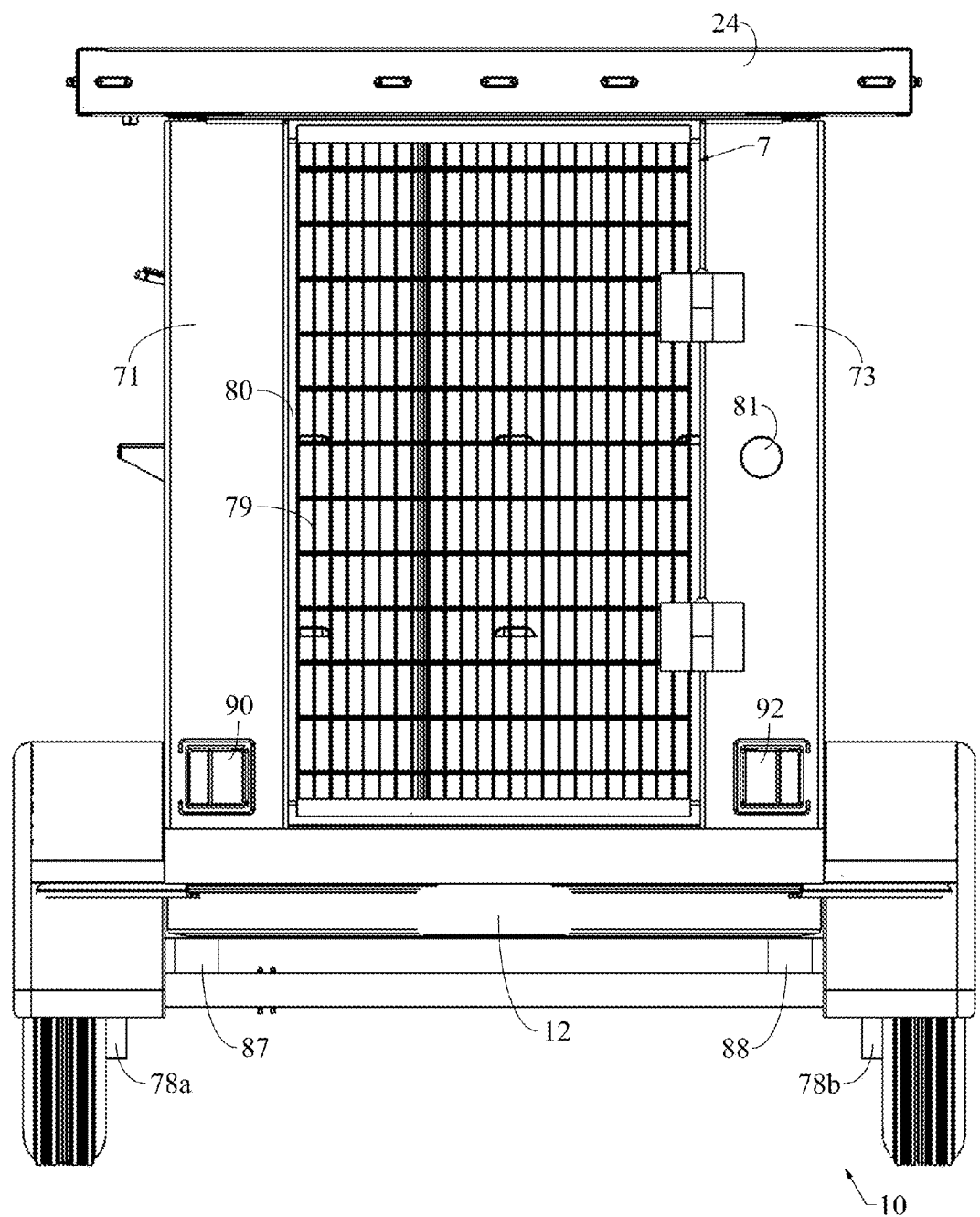
FIG. 7 is a back view of the power supply trailer with an on-board security containment area.

FIG. 7 shows a back view of the portable solar power supply trailer 10 with trailer brakes 78a, 78b and the solar array frame 24 disposed horizontally on the frame, which can maximize the absorption of the sun's rays.

This view also shows a first spring 87 supporting the first wheel on the first axel and a second spring 88 supporting the second wheel also on the first axel. A first trailer brake light 90 and a second trailer brake light 92 are shown for enabling the portable solar power supply trailer 10 to be towed on a roadway in the night, complying with federal or state regulatory laws about illuminating the back of a tow vehicle.

In this Figure, the security containment area 7 can be formed between the solar array frame 24, the trailer frame 12, the first support 71 and second support 73. At least one bar can be used with the steel grating 79. The hinged locking door 80 can be seen, which can further have a bumper 81.

While these embodiments have been described with emphasis on the embodiments, it should be understood that within the scope of the appended claims, the embodiments might be practiced other than as specifically described herein.

What is claimed is:

1. A portable solar power supply trailer with a security containment area and multiple power interfaces comprising:
   a. a trailer with a trailer frame, at least one axel secured to the trailer frame, a first wheel secured to the axel and a second wheel secured to the axel opposite the first wheel, and a support hitch connected to the trailer frame;
   b. an enclosure disposed on the trailer frame having an enclosure top and an enclosure bottom, wherein the enclosure bottom is fastened to the trailer frame and the enclosure covers no more than 25 percent of the trailer frame, and further wherein the enclosure comprises:
   c. a solar array frame disposed on the enclosure, wherein the solar array frame comprises: a first side, a second side, a third side, and a fourth side, wherein the solar array frame covers the entire trailer frame and the enclosure top, and further wherein solar array frame comprises at least one photovoltaic cell for providing power to the enclosure;
   d. the enclosure further comprises:
      i. an enclosure first side;
      ii. an enclosure second side;
      iii. an enclosure third side;
      iv. an enclosure fourth side with a fourth side opening;
      v. an interior space within the enclosure sides;
      vi. a projecting flange surrounding the opening extending from the fourth side of the enclosure; and
      vii. at least one door for providing access to the interior space;
      viii. a plurality of power interfaces provided on at least one of the enclosure sides for access by a user external to the enclosure side, and wherein each power interface provides between 6 DC volts to 27 DC volts of current, between 110 AC volts to 230 AC volts of current or combinations thereof, to at least one rechargeable user device engaging at least one power interface;
      ix. a plurality of batteries in the interior space;
      x. a solar controller in the interior space connected to the at least one photovoltaic cell, and to each of the plurality of power interfaces and the plurality of batteries, wherein the solar controller monitors and controls charging of at least one of the plurality of batteries;
      xi. a power interface timer connected to the solar controller comprising a push button for actuating at least one of the plurality of power interfaces for a predefined period of time; and
      xii. at least one fastener for securing the door to the fourth side;
   e. a first post and a second post connected to a front end of the solar array frame for supporting the solar array frame non-deformably above the trailer frame; and
   f. a first support and a second support connected to a back end of the solar array frame for supporting the solar array frame non-deformably above the trailer frame.

2. The portable solar power supply trailer of claim 1, further comprising an inverter disposed in the interior space.

3. The portable solar power supply trailer of claim 1, further comprising a first systems charge gauge connected to one of the enclosure sides, wherein the first systems charge gauge monitors charging current from at least one photovoltaic.

4. The portable solar power supply trailer of claim 3, further comprising a second systems charge gauge for monitoring the charge status of at least one of the plurality of batteries in the enclosure.

5. The portable solar power supply trailer of claim 1, further comprising a gasket disposed between the door and the projecting flange for providing a watertight connection.

6. The portable solar power supply trailer of claim 1, wherein the predefined period of time can be adjusted after accessing the interior space.

7. The portable solar power supply trailer of claim 1, further comprising a high security containment area formed between the solar array frame, the trailer frame, the enclosure, the first support and the second support.

8. The portable solar power supply trailer of claim 7, wherein the high security containment area comprises bars.

9. The portable solar power supply trailer of claim 7, wherein the high security containment area comprises a steel grating with a hinged locking door.

10. The portable solar power supply trailer of claim 9, wherein the hinged locking door has a bumper.

11. The portable solar power supply trailer of claim 1, wherein the trailer has brakes.

12. The portable solar power supply trailer of claim 1, wherein the enclosure has a protective cover removably disposed over the plurality of power interfaces.

13. The portable solar power supply trailer of claim 1 further comprising a shelf for supporting at least one rechargeable user device when plugged into one of the plurality of power interfaces.

14. The portable solar power supply trailer of claim 1, further comprising at least one light disposed over the plurality of power interfaces, wherein the at least one light is connected to a light timer for controlling illumination over the plurality of power interfaces for a preset period of time, and further wherein the light timer communicates with the solar controller for providing power for illumination from at least one of the batteries, the at least one photovoltaic or combinations thereof.

15. The portable solar power supply trailer of claim 1, further comprising a first spring supporting the first wheel on the axel and a second spring supporting the second wheel on the axel.

16. The portable solar power supply trailer of claim 1, further comprising a first trailer brake light and a second trailer brake light.

17. The portable solar power supply trailer of claim 1, further comprising a storage box mounted to the trailer frame.

18. The portable solar power supply trailer of claim 1, further comprises at least one fender mounted over each wheel and secured to the trailer frame.

19. The portable solar power supply trailer of claim 1, further comprising at least three leveling jacks secured to the trailer frame.

20. The portable solar power supply trailer of claim 1, further comprising a battery balancing circuit communicating between each of the batteries and the solar controller.

* * * * *